July 15, 1969     E. LUDVIG ETAL     3,455,455
DEVICE FOR THE ANALYSIS OF THE FILTER CHARACTERISTICS
OF POROUS MEDIA
Filed March 3, 1967
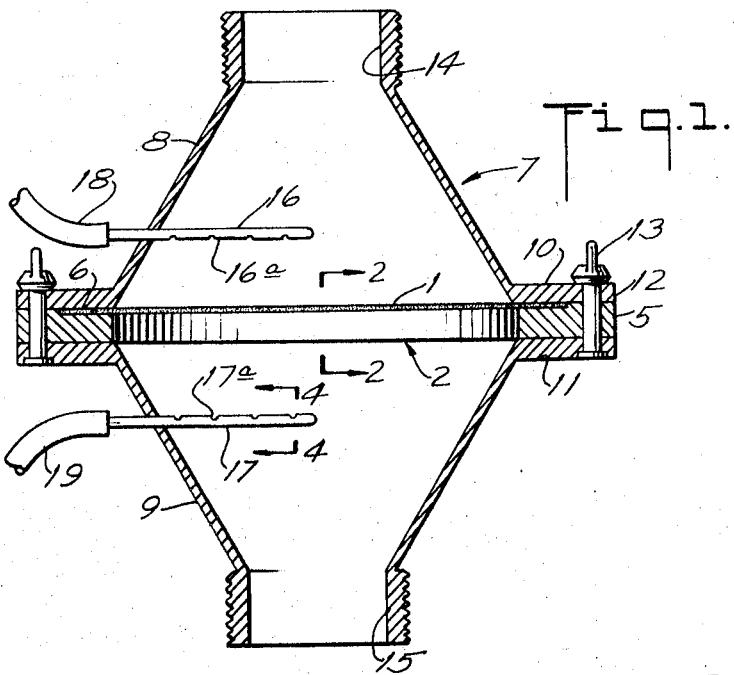
Fig. 1.
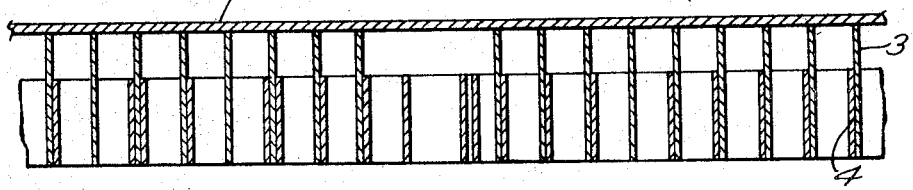
Fig. 2.
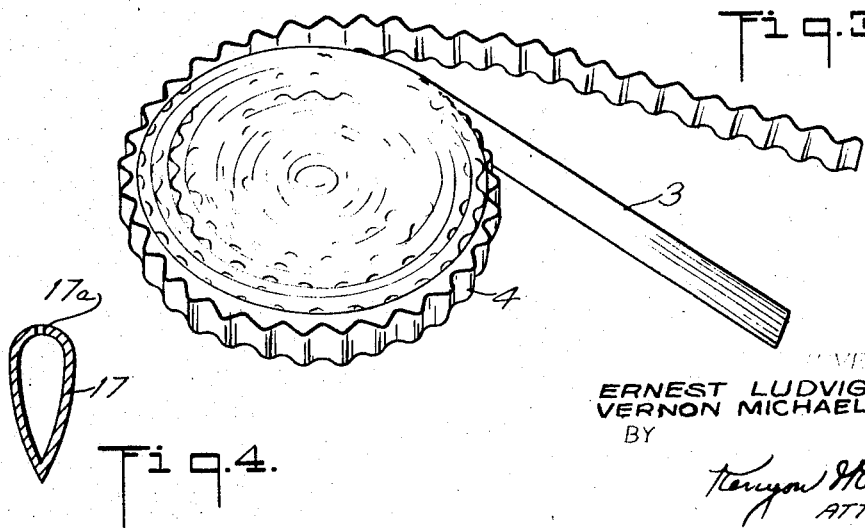
Fig. 3.
Fig. 4.
INVENTORS.
ERNEST LUDVIG
VERNON MICHAEL TULL
BY
ATTORNEYS

United States Patent Office 3,455,455
Patented July 15, 1969

3,455,455
DEVICE FOR THE ANALYSIS OF THE FILTER
CHARACTERISTICS OF POROUS MEDIA
Ernest Ludvig, New York, N.Y., and Vernon M. Tull,
Edison, N.J., assignors to Purolator Products, Inc., Rah-
way, N.J., a corporation of Delaware
Filed Mar. 3, 1967, Ser. No. 620,544
Int. Cl. B01d 35/00
U.S. Cl. 210—93                                    2 Claims

ABSTRACT OF THE DISCLOSURE

A porous load-bearing support for a layer of porous media is formed by a composite coil comprising a flat coil of flat metal strip having its convolutions interspaced by an interleaved coil of corrugated metal strip of less width than the flat strip. The tips of the corrugated strip are bonded to the sides of the flat strip. The top edges of the latter project above the top edges of the corrugated strip and form a flat surface for a layer of porous media to be analyzed as to its filter characteristics. A housing is formed by two conical parts which are clamped together on opposite sides of the load-bearing support in a fluid-tight manner with their apices pointing away from each other and having ports formed in these apices with the one on the side of the load-bearing structure forming an inlet, and the other port forming an outlet. Small diameter fluid-removing probes extend right angularly into the flow of fluid through the housing on both sides of the load-bearing support.

---

This invention relates to a device for the analysis of the filter characteristics of porous media. For example, it may be used by filter manufacturers to determine the efficiency with which a layer of porous media removes contaminants from a fluid flow, whereby to assist in the selection of a suitable porous media for filters.

A device of this character obviously must include a housing for a flow of fluid containing a known amount of test particles and some way to position the layer of porous media to be analyzed so that this flow passes through the media, together with some means for removing samples of the flow from the opposite sides of the media so that by analysis the filter efficiency of the media may be determined.

The present invention provides for the passage of the fluid at a substantially constant flow velocity in a normal direction through the media with the test particles uniformly distributed throughout the fluid, including the fluid leaving the media with any particles remaining, using a housing substantially free from entrapment of the particles and having a load-bearing support for the media which prevents it from rupturing under high differential fluid pressures without appreciably impeding an undisturbed fluid flow through the media, and probes for removing properly representative samples of the fluid flow from both sides of the media.

The principles of this invention may be understood from the following description of the specific example of the invention illustrated by the accompanying drawings, the various figures of these drawings being as follows:

FIG. 1 is a vertical, longitudinal section of this example;

FIG. 2 is a cross-section of the load-bearing support, taken on the line 2—2 of FIG. 1;

FIG. 3 is a perspective view showing the assembly of this support; and

FIG. 4 is a cross-section of one of the probes, taken on the line 4—4 of FIG. 1.

Referring to these drawings, a layer of porous media 1, whose filter characteristics are to be analyzed, is shown positioned on the load-bearing support 2.

This load-bearing support 2 comprises a circular metal grid formed by a composite coil comprising a flat coil of flat metal strip 3 having its convolutions interspaced by an interleaved coil of corrugated metal strip 4 of less width than the flat strip and with the tips of the corrugations of this corrugated strip bonded firmly to the sides of the flat strip 3. The top edges of the flat strip project above the top edges of the corrugated strip and form a flat or plane support for the layer of porous media 1.

A ring 5 surrounds the periphery of the composite coil and is bonded firmly to this periphery. This ring 5 is made of metal and has a counterbore 6 of sufficient depth to receive the peripheral edge portion of the media 1.

The bond of the above parts is a metallic one and may be effected in any convenient fashion as by the use of solder. With the strips 3 and 4 made of ferrous metal it is possible to assemble the parts as described, heat the entire assembly, tin with an appropriate solder and flux treatment and then place the assembly on a flat magnetic table such that a plane on the bottom side is established as to the parts 3, 4 and 5. Cooling results in firm bonding.

The housing 7 is formed by two parts 8 and 9 having flanges 10 and 11 fitting the opposite sides of the ring 5 and releasably clamped firmly to these sides by screws 12 having wing nuts 13. The depth of the counterbore 6 should be such that the media 1 is clamped therein in a fluid-tight manner and the two flanges fit the opposite faces of the ring in a fluid-tight manner.

The housing parts 8 and 9 are conical in shape with their apices facing away from each other, the part 8 at its apex having a cylindrical port 14, forming an inlet, and the other part 9 at its apex having a cylindrical port 15 forming an outlet. The term "apex" here is meant to indicate the smaller ends of the parts 8 and 9.

The parts 8 and 9 flare towards each other and may have shapes other than conical but they should be formed with circular cross-sections. In any event, the two parts should be proportioned so that a stream of fluid entering the port 14 expands smoothly without turbulence of any substantial nature, passes through the layer of media 1 and the porous support 2 and out the outlet 15 in a smooth manner and with the flow at a right angle or normal to the support 2 and therefore the layer of porous media 1.

The construction of the load-bearing support 2 is important. With the incoming fluid containing a contaminant, such as a known percentage of fine AC dust, the porous media 1 becomes gradually dirt loaded and therefore pressure loaded to a considerable degree. For example, a typical disk of porous media of roughly 30 sq. in. in area may be subject to mechanical loading of 600 lb. or more. The described support structure can resist such loading without interfering with the free flow of fluid from the bottom or downstream side of the filter media 1. The latter is supported only by the top edges of the flat strip 3, and the flow through the various passages provided by the corrugated metal strip 4 is smooth and free from appreciable turbulence. It is to be understood that both strips of metal can be of very thin gauge as compared to their width.

The probes 16 and 17 are located above and below the load-bearing porous structure 2 within the housing 7.

These probes are in the form of tubes of very small cross-sectional area as compared to the cross-sectional area of the housing 7 in the location where the probes are positioned. The probes are positioned so that they are spaced in each instance between both the load-bearing support 2 and the respectively adjacent ones of the ports 14 and 15. The probes project into the housing 7 at right angles to the flow or, in other words, parallel to the support structure 2. The housing parts 8 and 9 would ordinarily be made of metal and the probes may be installed through holes formed in the walls of the parts 8 and 9 and positioned by solder or other firm bonding.

Each probe has a series of longitudinally interspaced holes 16a and 17a respectively, formed in it, their ends being closed. The probes should be sufficiently long to project approximately to or beyond the center line of the housing 7.

The conical housing parts 8 and 9, the ports 14 and 15, and the circular structure 2 including its ring 5 are symmetrical about the center line of the device. The size of the holes 16a and 17a in the probes should be such as to pass the test particles in the flow, this applying also to the inside diameters of the tubular probes 16 and 17.

The interspacing of the holes 16a and 17a and the number of the holes should be such as to withdraw specimens or samples of the flow from above and below the porous media in accordance with good sampling techniques. Fluid withdrawn is carried away by tubes 18 and 19 fitted over outwardly projecting ends of the probes 16 and 17 respectively.

The small diameters of the probes 16 and 17 serve to avoid any substantial disturbance of the smooth flow of fluid as it gradually slows in velocity due to the flaring shape of the housing part 8 and again as the fluid gradually accelerates in velocity due to the converging shape of the housing part 9 approaching the port 15. The probes 16 and 17 may have a cross-sectional shape that is streamlined in the direction of the flow as indicated in FIG. 4. The probes may be made from metal tubing.

In operation, fluid containing a quantity of particulate matter is introduced through the inlet port 14, the fluid stream then diverging smoothly so that it enters the porous media 1 essentially at right angles or normal thereto and at a velocity that is substantially constant over the exposed surface of the media 1. The resulting pressure on the media 1 is transmitted to the load-bearing support previously described, and then through the ring 5 to the flange 11 of the housing 7. This flange 11 should of course be adequately supported. Pressure drop or turbulence due to the flow through the support 2 is negligible. The shape of the housing part 9 causes the fluid flow to accelerate smoothly until it leaves the outlet port 15.

As the flow occurs, samples or specimens may be constantly withdrawn through the probes 16 and 17 and used for comparative analysis. Since the fluid in the housing ordinarily should have a pressure above atmospheric pressure, the abstracting of specimens should occur naturally.

Disassembly and reassembly of the device is relatively obvious. The wing nuts 13 are unscrewed and the housing parts 8 and 9 separated. This is done for the removal and replacement of the layer of media 1, and for servicing.

Due to the described construction, there is practically no place for contaminants to collect and be retained inside of the device. The fine particles introduced for the analysis of filter efficiency do not tend to stratify either upstream or downstream of the media. It is immaterial whether or not the test media 1 has the physical strength to avoid rupture under the pressure of the flow, because the media is supported at so many closely interspaced locations by the upwardly projecting portions of the convolutions of the flat strip 3. It has already been mentioned that the load-bearing structure 2 has free flow characteristics but in this connection it might be mentioned that prior art mechanical support matrices heretofore used have resulted in a blockage of as much as 40% of the test media and have created considerable disturbance in the fluid flow in the vicinity of the downstream side of this media. The described device provides adequate mechanical support of the media to be analyzed while blocking no more than about 1–2% of its area.

What is claimed is:
1. A device for the analysis of the filter characteristics of porous media, comprising a porous load-bearing support structure on which a layer of said media may be positioned, said support structure comprising a composite coil formed by a flat coil of flat metal strip having its convolutions interspaced by an interleaved coil of corrugated metal strip of less width than said flat strip and with the tips of the corrugations of said corrugated strip bonded firmly to the sides of said flat strip, the top edges of the latter projecting above the top edges of said corrugated strip and forming a flat support for said layer of porous media, and a ring bonded to the outer periphery of said composite coil, a housing formed by two parts releasably connected fluid-tightly to the periphery of said structure and of said layer when thereon, said parts respectively being connected to opposite sides of said structure and layer and forming chambers having ports spaced oppositely to said structure and layer and walls diverging from said ports towards said structure and layer, said chamber's parts having flanges overlying said ring and means for releasably clamping them together with said ring therebetween, said walls being substantially the same in shape and being formed by circular cross-sections symmetrically positioned about a common center line and said ports being of circular cross-section and symmetrically positioned with respect to said center line, the one of said ports on the side of said structure on which said layer is positioned forming a fluid outlet, said support structure being circular and positioned in a plane at a right angle to said center line, and probes projecting into said housing on both sides of said structure and layer for removing fluid therefrom separately for analysis.

2. The device of claim 1 and in which said probes are formed by tubes projecting through said walls substantially parallel to said structure, each tube having longitudinally interspaced inlet holes in its wall and being positioned spaced from said structure and the adjacent one of said ports and having a small cross-section as compared to the cross-section of the circular cross-section of the portion of said wall where said tube is positioned.

References Cited
UNITED STATES PATENTS

| | | | |
|---|---|---|---|
| 476,671 | 6/1892 | Moeller | 210—489 X |
| 536,503 | 3/1895 | Albach | 210—85 |
| 1,517,144 | 11/1924 | Anderson. | |
| 2,617,302 | 11/1952 | Massiot | 210—85 X |
| 2,669,995 | 2/1954 | Troy | 55—520 X |
| 2,790,253 | 4/1957 | Ayer. | |
| 3,176,504 | 4/1965 | Shapiro | 73—61.4 |
| 3,334,044 | 8/1967 | Satterlee | 210—96 X |

FOREIGN PATENTS

| | | |
|---|---|---|
| 575,378 | 4/1933 | Germany. |
| 664,307 | 8/1938 | Germany. |

REUBEN FRIEDMAN, Primary Examiner

JOHN ADEE, Assistant Examiner

U.S. Cl. X.R.

210—445, 494